(12) United States Patent
Ahn et al.

(10) Patent No.: US 8,767,383 B2
(45) Date of Patent: Jul. 1, 2014

(54) SUPPORT ASSEMBLY AND COMPUTER DEVICE HAVING THE SAME

(75) Inventors: Jin-hyuk Ahn, Hwaseong-si (KR); Yun-pil Yeom, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 439 days.

(21) Appl. No.: 13/084,821

(22) Filed: Apr. 12, 2011

(65) Prior Publication Data

US 2011/0310548 A1    Dec. 22, 2011

(30) Foreign Application Priority Data

Jun. 22, 2010    (KR) .................. 10-2010-0059138

(51) Int. Cl.
*H05K 5/00*    (2006.01)
*H05K 7/00*    (2006.01)
*G06F 1/16*    (2006.01)

(52) U.S. Cl.
CPC .................................. *G06F 1/1681* (2013.01)
USPC ............ 361/679.27; 361/679.28; 361/679.26; 361/679.21; 361/679.55; 361/679.56

(58) Field of Classification Search
USPC ............. 361/679.28, 679.27, 679.26, 679.21, 361/679.55, 679.56; 248/422
See application file for complete search history.

(56) References Cited

U.S. PATENT DOCUMENTS

2005/0225934 A1* 10/2005 Homer et al. .................. 361/683
2007/0030410 A1* 2/2007 Cheng ............................. 349/58

\* cited by examiner

*Primary Examiner* — Tuan T Dinh
*Assistant Examiner* — Steven T Sawyer
(74) *Attorney, Agent, or Firm* — Stanzione & Kim, LLP (57) ABSTRACT

A support assembly which supports a computer device body having a display unit. The support assembly includes a base member which is supported on an installation plane, a shaft which extends in parallel to a plane of the base member, a first support member having one end portion joined to the base member and the other end portion which supports the shaft, at least one pinion gear which is concentrically joined to the shaft, a second support member including a first support part which supports the computer device body having the display unit, a second support part which extends from the first support part to have a predetermined curvature, and a rack gear which is formed on a plane of the second support part facing the shaft along the extension direction of the second support part and moves according to rotation of the computer device body supported by the first support part.

19 Claims, 8 Drawing Sheets

SUPPORT ASSEMBLY AND COMPUTER DEVICE HAVING THE SAME

CROSS-REFERENCE TO RELATED APPLICATIONS

This application claims priority under 35 U.S.C. §119(a) from Korean Patent Application No. 10-2010-0059138, filed on Jun. 22, 2010 in the Korean Intellectual Property Office, the disclosure of which is incorporated herein by reference.

BACKGROUND

1. Field of the Invention

Apparatuses and methods consistent with the exemplary embodiments relate to a support assembly which supports a device body having a display unit for displaying an image and a computer device having the support assembly, and more particularly, to a support assembly with an improved hinge structure for rotating a device body and a computer device having the support assembly.

2. Description of the Related Art

A computer device incorporates a main board including a central processing unit (CPU) for arithmetic operation, a memory in which programs and data are stored, and option boards corresponding to various functions which assist the CPU, such as a graphics card, and execute various applications desired by a user on an operating system. Such a computer device may be implemented in various forms including a desktop computer, a laptop computer, and others known and used in the art. In recent years, computer devices of a pad type, where a computer body and a display panel are accommodated in a single housing, have been put on the market.

A pad type computer device includes a rectangular plate-shaped device body having a display panel installed in the front, and a support assembly which rotatably supports the device body to allow the display panel to be maintained at a predetermined angle with respect to an installation plane.

Conventional support assemblies have a structure where a hinge shaft is installed in the rear of a device body which is tilted and rotated around the hinge shaft. Accordingly, when the body is rotated, a tilting angle is limited as the body interferes with a stand coupled to the body through the hinge shaft.

The body of the computer device of the pad type additionally includes a touch screen to allow the device to be used in a tablet mode, in which case the display panel is conveniently used when it is parallel to an installation plane. However, since the conventional support assemblies have a limited tilting angle on their structure, it may be difficult to tilt and rotate the body to an angle desired by a user in response to a tablet mode and a normal mode, respectively.

SUMMARY

Accordingly, one or more exemplary embodiments of the present general inventive concept provide a support assembly which is capable of supporting a device body with a simple structure so that the device body can be rotated over an angle range within which the device body is parallel to or perpendicular to an installation plane, and a computer device having the support assembly.

Additional features and utilities of the present general inventive concept will be set forth in part in the description which follows and, in part, will be obvious from the description, or may be learned by practice of the present general inventive concept.

Embodiments of the present general inventive concept provide a support assembly which supports a computer device body having a display unit, including a base member which is supported on an installation plane, a shaft which extends in parallel to a plane of the base member, a first support member having one end portion joined to the base member and the other end portion which supports the shaft, at least one pinion gear which is concentrically joined to the shaft, a second support member including a first support part which supports the computer device body having the display unit, a second support part which extends from the first support part to have a predetermined curvature, and a rack gear which is formed on a plane of the second support part facing the shaft along the extension direction of the second support part and moves according to rotation of the computer device body supported to the first support part, the rack gear engaging the at least one pinion gear in order to hold a position of the second support part, and a third support member which is joined to the base member and movably supports the second support member.

The support assembly may further include an elastic member which is placed on the shaft and elastically biases the shaft in a direction in which the weight of the computer device body supported to the first support part is overcome.

The elastic member may include a coil spring or a leaf spring, with a first end portion of the elastic member joined to the shaft and a second end portion of the elastic member joined to the first support member.

The center of the curvature of the second support part may be different from the rotation center of the shaft.

The angular measure of the predetermined curvature of the second support part may be smaller than an angular measure of the curvature of the pinion gear.

The first support member may have one end portion joined to the base member, the one end portion being parallel to the installation plane, and the other end portion, which is erectly bent from the one end portion joined to the base member and configured to support the shaft.

The first support member may be fastened to the base member by screws, rivets, or pins.

The second support member may further include a projection projecting from the second support part, and the third support member may include a projection support member having one end portion interposed between the first support member and the base member and the other end portion formed therein with a guide part which guides and accommodates the projection moving along the second support part.

The third support member may include a second support part support member which is joined to the base member and supports a plane opposite to a plane of the second support part where the rack gear is placed.

The base member may include a first base part which extends parallel to the lengthwise direction of the shaft, and a second base part which has a step lower than the first base part, the first support member being joined to a plane of the second base part.

The computer device body may have a rectangular plate shape where the display unit is placed in the front side, and a step between the first base part and the second base part may be provided such that planes of the first base part and the display unit have substantially the same height when the computer device body is rotated parallel to the installation plane.

Embodiments of the present general inventive concept provide a computer device including a computer device body having a display unit placed in the front side, and the above-described support assembly which rotatably supports the computer device body with respect to an installation plane.

Embodiments of the present general inventive concept further provide that, by implementing a simple structure to allow the device body to be rotated and supported between a position where the device body is parallel to the installation plane and a position where the device body is erected on the installation plane, it is possible to easily rotate and use the device body in either a normal mode or a tablet mode of the device body.

Embodiments of the present general inventive concept further include a rack and pinion computer support device, comprising a first support member to support a computer device, a second support member extending from the first support member comprising a curved rack to rotate the first support member, a shaft member comprising a pinion gear to engage with the rack, a plurality of shaft support members to support the shaft member, and at least one fixed projection support member attached to the plurality of support members to limit rotation of the first support member, wherein as the shaft member rotates, the engagement of the pinion gear along the curved rack rotates the first support member.

BRIEF DESCRIPTION OF THE DRAWINGS

The above and/or other aspects of the present general inventive concept will become apparent and more readily appreciated from the following description of the exemplary embodiments, taken in conjunction with the accompanying drawings, in which.

DETAILED DESCRIPTION OF THE EXEMPLARY EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
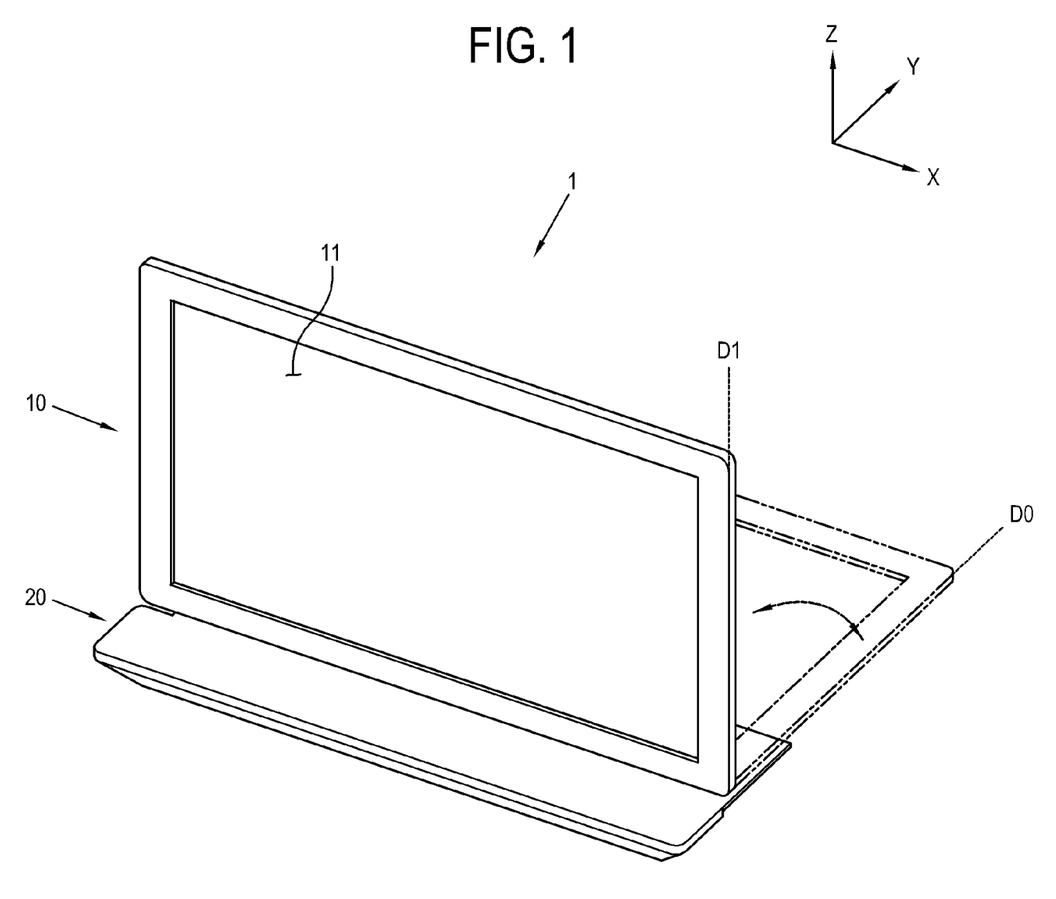
FIG. 1 is a perspective view of a computer device according to an exemplary embodiment of the present general inventive concept.

FIG. 1 is a perspective view of a computer device 1 according to an exemplary embodiment of the present general inventive concept.

Referring to FIG. 1, the computer device 1 according to this exemplary embodiment includes a device body 10 and a support assembly 20 which supports the device body 10 on an installation plane, for example, a floor.

In FIG. 1, X, Y, and Z directions are mutually orthogonal directions and means transverse, longitudinal and vertical directions, respectively. In this exemplary embodiment of the present general inventive concept, a lower edge of the device body 10 supported by the support assembly 20 is parallel to an X direction axis line. The opposites to the X, Y, and Z directions are denoted by -X, -Y, and -Z, respectively and an X-Y plane means a plane defined by an X direction axis and a Y direction axis. Figures including FIG. 1 and exemplary embodiments of the present general inventive concept will be illustrated and described below on the basis of such direction definitions.

The device body 10 has a rectangular plate shape, with a display unit 11 for display of an image installed at its one side. The device body 10 may include a CPU (not illustrated) for arithmetic operation, a memory (not illustrated) in which programs and data are stored, a main board (not illustrated) mounted thereon with various chipsets (not illustrated) for extension and additional functions, and a power supply unit (not illustrated) for supply of power, all of which are installed in the rear of the display unit 11.

With such a hardware configuration, the device body 10 performs processes desired by a user by executing various software applications on an operation system. The display unit 11 of the device body 10 may be implemented by a touch screen, in case of which the device body 10 may be selectively operated in either a normal mode or a tablet mode.

When the device body 10 is operated in the normal mode to perform the general computer functionalities, it is preferable that a plane of the display unit 11 keeps erect on the installation plane, i.e., the display unit 11 remains in a condition where it is parallel to the Z direction axis line or is rotated at a predetermined angle with respect to the installation plane. This allows a user to easily perceive an image displayed on the display unit 11.

On the other hand, when the device body 10 is operated in the tablet mode to perform information input when the user touches the plane of the display unit 11 directly or using a stylus pen, it is preferable that the plane of the display unit 11 keeps parallel to the installation plane, i.e., the display unit 11 remains in a condition where it is in-parallel to the X-Y plane. This allows the user to input information by easily touching the plane of the display unit 11.

The support assembly 20 may support a lower edge of the device body 10 on the installation plane. The support assembly 20 may support the device body 10 to be tilted and rotated between an angle D0, at which the device body 10 is parallel to the installation plane, and an angle D1, at which the device body 10 is erected on the installation plane, with the lower edge of the device body 10 as a central axis. This allows the user to rotate the device body 10 at the angle D0 when the device body 10 is in the tablet mode and rotate the device body 10 at the angle D1 or at a desired angle between the angle D0 and the angle D1 when the device body 10 is in the normal mode.

Figure 2:
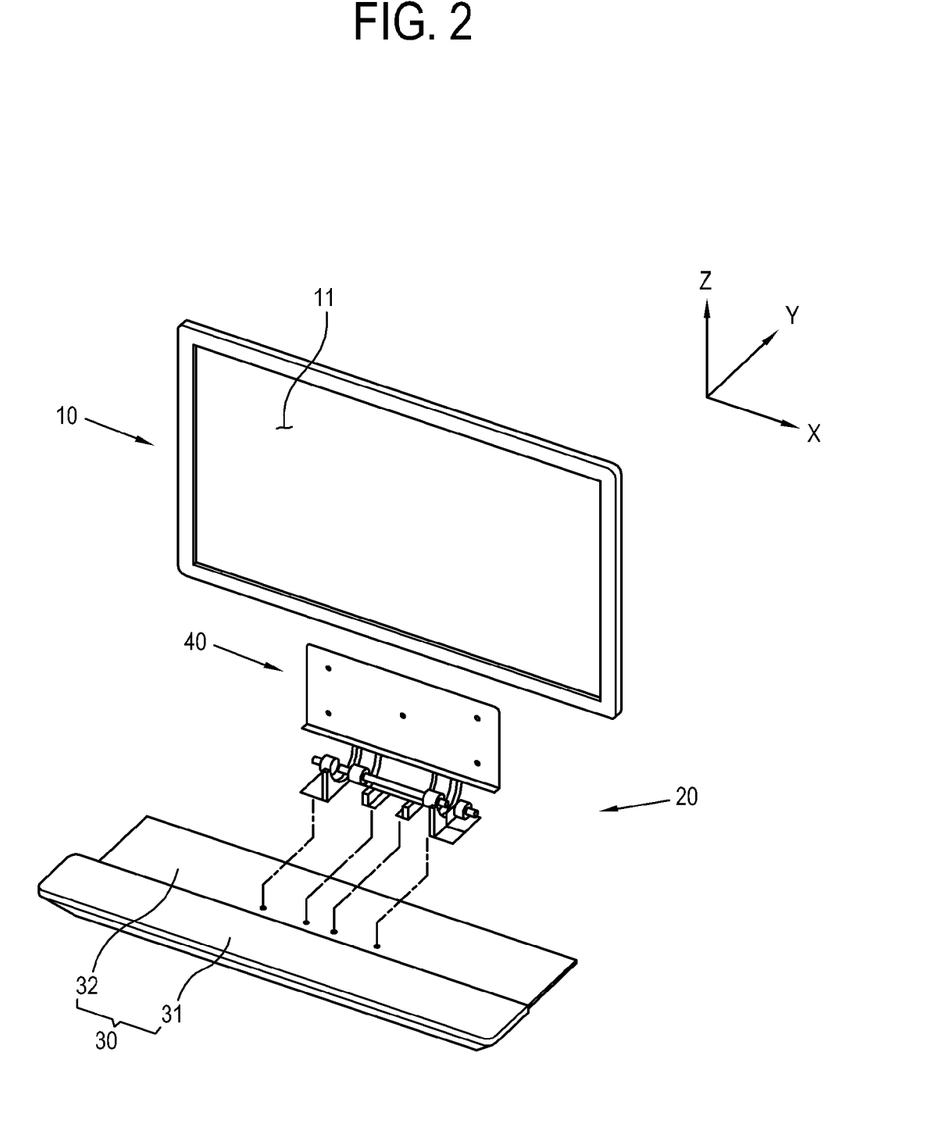
FIG. 2 is an exploded perspective view of the computer device of FIG. 1.

Hereinafter, the support assembly 20 will be described in more detail with reference to FIG. 2. FIG. 2 is an exploded perspective view of the computer device 1 which is exploded into the device body 10 and the support assembly 20.

Referring to FIG. 2, the support assembly 20 may include a base member 30 supported on the installation plane, and a body support unit 40 which is installed on the base member 30 and rotatably supports the device body 10.

The base member 30 extends along the X direction axis line parallel to the lower edge of the device body 10. The base member 30 may include a first base part 31 which extends along the lower edge of the device body 10, and a second base part 32 which extends from the first base part 31 in such a manner that the second base part 32 has a step lower than the first base part 31, and is mounted thereon with the body support unit 40. In other words, if a user is located in the -Y direction of the device body 10, the first base part 31 is located at the user side and the second base part 32 is located in the Y direction of the first base part 31.

Under the condition where the base member 30 is supported on the installation plane, steps of upper planes of the first and second base parts 31 and 32 may be designated in various manners in a design stage. For example, when the device body 10 is under the condition where it is rotated parallel to the installation plane, these steps may be provided in such a manner that the upper planes of the display unit 11 and the first base part 31 have substantially the same height, which may result in improvement of design and availability of the computer device 1.

Figure 3:
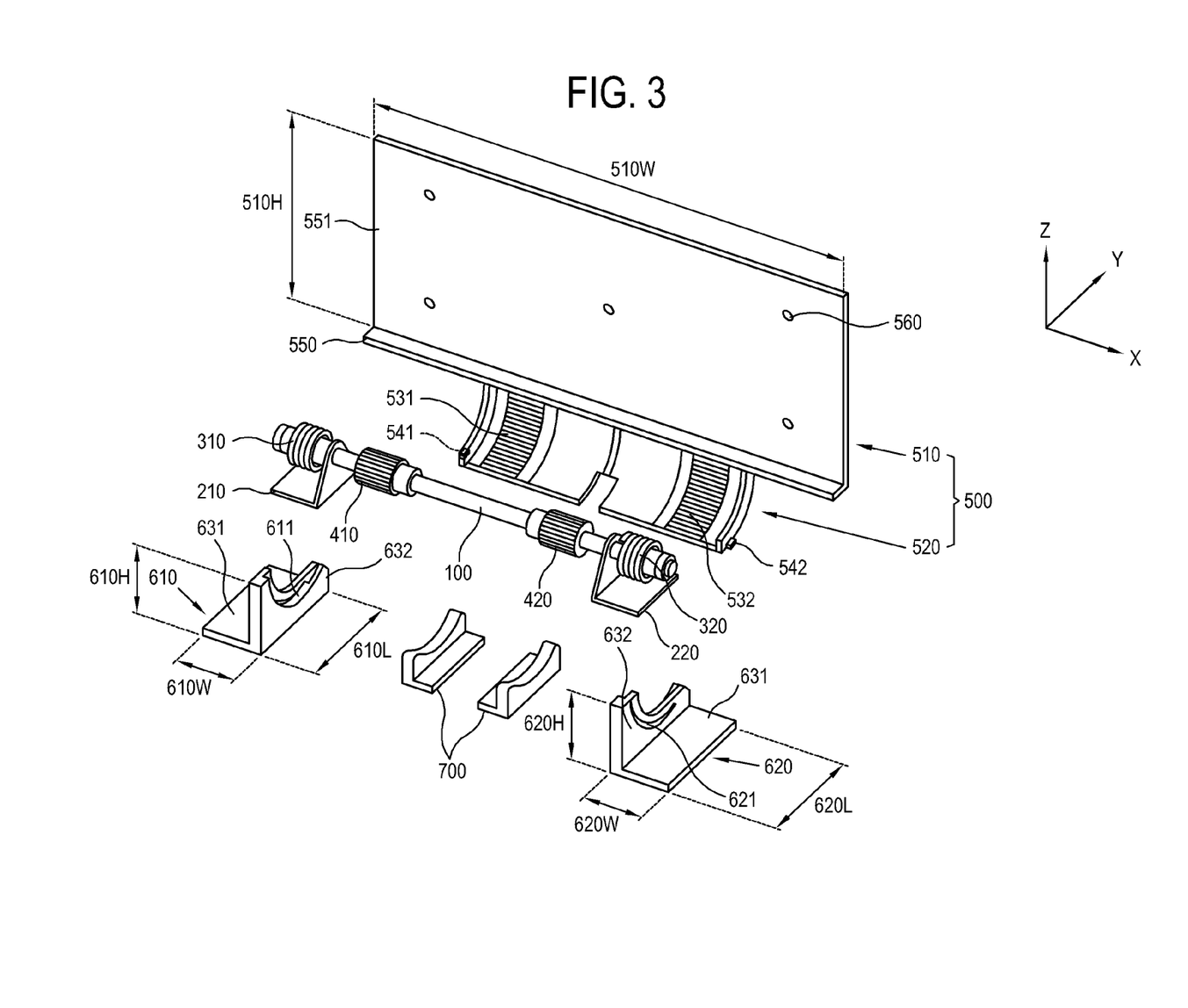
FIG. 3 is an exploded perspective view of a support assembly in the computer device of FIG. 2.

Hereinafter, the body support unit 40 will be described in more detail with reference to FIG. 3. FIG. 3 is an exploded perspective view of the body support unit 40.

Referring to FIG. 3, the body support unit 40 may include a shaft 100 which extends along the X direction axis line, shaft support members 210 and 220 which are joined to the second base part 32 and rotatably support the shaft 100, elastic members 310 and 320 which elastically bias the shaft 100 in a preset direction, pinion gears 410 and 420 which are concentrically joined to the shaft 100, and a device support member 500 which supports the device body 10 and is rotated to be separated from the shaft 100.

In addition, the body support unit 40 may further include projection support members 610 and 620 which accommodate projections 541 and 542 which will be described later, and a second support part support member 700 which rotatably support a second support part 520 which will be described later.

The shaft 100 extends parallel to the lower edge of the device body 10 on the second base part 32. The shaft 100 has both end portions which are rotatably supported by the shaft support members 210 and 220, thereby allowing the upper plane of the second base part 32 to be separated by a predetermined distance from the shaft 100.

The shaft support members 210 and 220 may have a symmetrical shape to allow both left and right end portions of the shaft 100 to be stably supported, which is merely an exemplary embodiment of the shaft support members 210 and 220 for rotatably supporting the shaft 100 with it separated from the second base part 32 without limiting the spirit of the present general inventive concept.

Each of the shaft support members 210 and 220 may have a first end portion which is parallel to the upper plane of the second base part 32, and a second end portion which extends to be substantially erected on and bent from the first end portion. In this exemplary embodiment of the present general inventive concept, the first end portion is a region joined to the second base part 32 and the second end portion is a region which rotatably supports the shaft 100. As in this exemplary embodiment, when two shaft support members 210 and 220 support the shaft 100 together, they have a shape and an installation position which are symmetrical with respect to the Y direction axis line.

The first end portions of the shaft support members 210 and 220 may be joined to the second base part 32 in different ways, for example, through screws, rivets, pins, and the like, or by forming a hook and hook accommodating groove corresponding to the first end portions and the second base part 32, respectively.

The elastic members 310 and 320 may elastically bias the shaft 100 supported by the shaft support members 210 and 220 in a preset rotation direction. In this exemplary embodiment of the present general inventive concept, the direction in which the elastic members 310 and 320 elastically bias the shaft 100 is a direction in which the device body 10 is tilted and rotated to be erected on the installation plane, i.e., weight of the device body 10 is overcome.

The elastic members 310 and 320 may be implemented by any appropriate ways including, for example, coil springs, leaf springs, and other springs known and used in the art. The elastic members 310 and 320 have their one end portions coupled to the shaft 100 and their other end portions coupled to the shaft support members 210 and 220, and provide a repulsive force by self-weight against tilt and rotation of the device body 10 in the direction parallel to the installation plane.

One or more of the pinion gears 410 and 420 may be joined to the shaft 100 and are rotated along with the shaft 100. In this exemplary embodiment, two pinion gears 410 and 420 are provided in the lengthwise direction of the shaft 100, which is, however, merely one exemplary embodiment without limiting the spirit of the present general inventive concept. The pinion gears 410 and 420 have a gear string which is formed on their periphery in the rotation direction of the shaft 100 and engages rack gears 531 and 532 which will be described later.

The device support member 500 may include a first support part 510, which supports the device body 10, a second support part 520, which extends from the first support part 510 to have a predetermined curvature, rack gears 531 and 532, which are formed on the second support part 520 in correspondence to the pinion gears 410 and 420, and projections 541 and 542, which project along the X direction axis line from left and right edges of the second support part 520.

The first support part 510 may support the lower edge of the device body 10 and may be implemented in various ways. For example, the first support part 510 may include a first region 550 which supports a lower side of the device body 10, and a second region 551 which is bent and extends from the first region 550 and supports the rear of the device body 10. In this manner, the first support part 510 has a shape on which the device body 10 is rested, but it may additionally include a structure to be fastened to the device body 10 by screws, rivets, or the like through a plurality of apertures 560 in the second region 551. Also, as illustrated in FIG. 3, the first support part 510 has a height 510H and a width 510W.

The second support part 520 may extend from the lower side of the first support part 510 to have a predetermined curvature. In this exemplary embodiment of the present general inventive concept, the center of the curvature of the second support part 520 is located at a point different from the rotation center of the shaft 100 and the extension and movement direction of the second support part 520 is according to a periphery of a circle with the point as its center. That is, considering a circle of a predetermined radius with a point at a predetermined location as its center and separated from the shaft 100, the second support part 520 extends along the periphery of this circle by a predetermined interval and is rotated or moved along the periphery. Accordingly, when the device body 10 supported by the first support part 510 is tilted and rotated, the second support part 520 may be rotated by a predetermined angle around the shaft 100 with the point as the center.

Here, the position of the point as the curvature center C of the second support part 520 is not limited. For example, the point may be located at a position separated by a predetermined distance from the shaft 100 upwardly. Accordingly, in this exemplary embodiment of the present general inventive concept, since the curvature radius of the second support part 520 is larger than the curvature radius of the pinion gears 410 and 420 with the shaft 100 as its center, the curvature of the second support part 520 is smaller than the curvature of the pinion gears 410 and 420 which are concentrically joined to the shaft 100.

Figure 7:
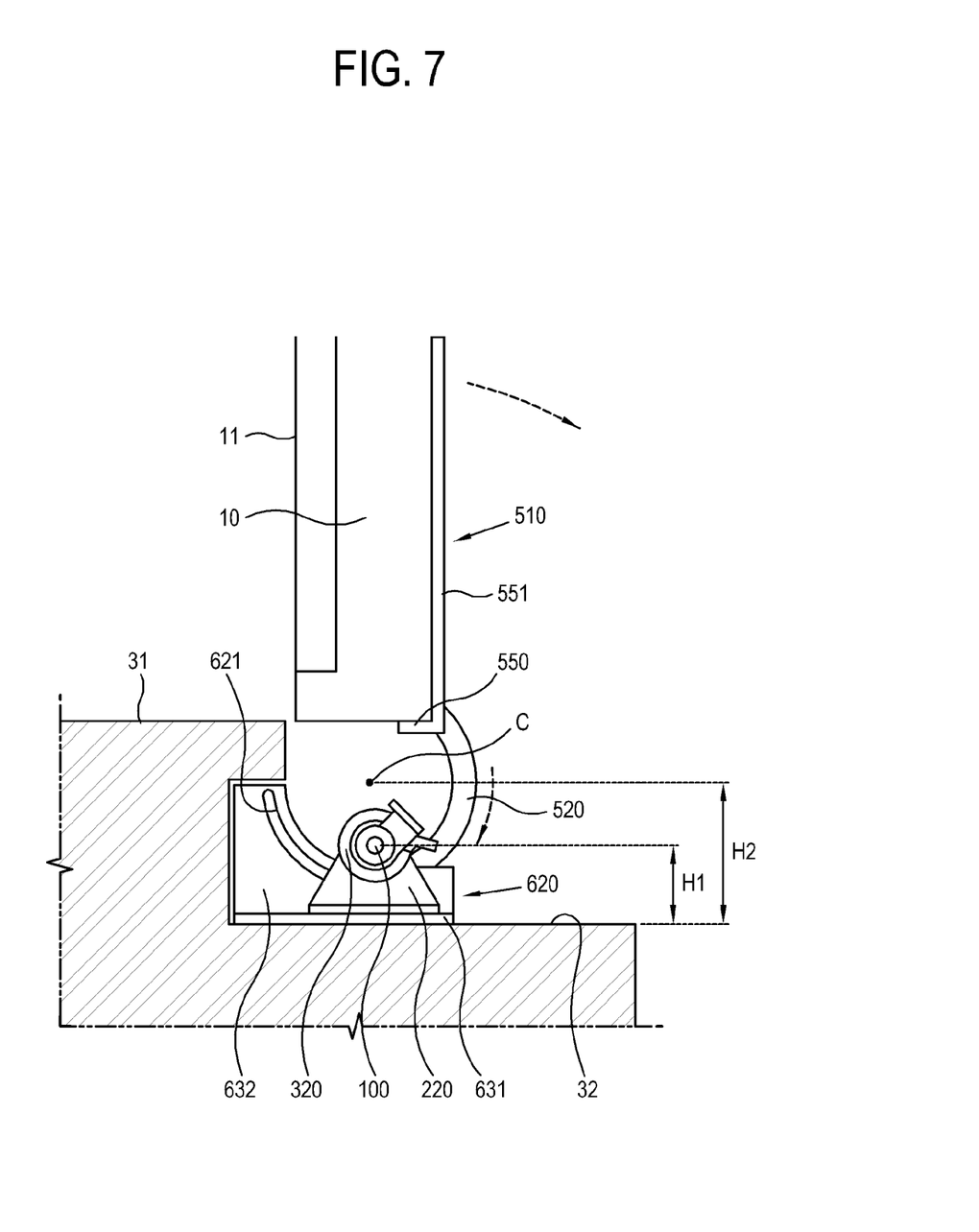
FIG. 7 is a side view of the support assembly of FIG. 4.

Additionally, FIG. 7 illustrates a distance H2 from curvature center C to a surface on the second base part 32 supporting the projection support member 620. Also illustrated in FIG. 7 is a distance H1 from the axis of rotation of shaft 100 and the surface on the second base part 32 supporting the projection support member 620.

The rack gears 531 and 532 may be placed on the second support part 520 facing the shaft 100 over a predetermined interval along the extension direction of the second support part 520. The rack gears 531 and 532 may have their regions engaging the pinion gears 410 and 420 depending on a position of the second support part 520 and cause the second support part 520 to be supported at its current position. In other words, movement of the rack gears 531 and 532 in engagement with the pinion gears 410 and 420 according to the rotation of the device body 10, together with an elastic bias of the elastic members 310 and 320, provides a repulsive force to maintain the position of the second support part 520 with respect to the shaft 100 against the weight of the device body 10.

The projections 541 and 542 project, respectively, from the left and right sides of the second support part 520 along the X direction axis line such that the projections 541 and 542 do not interfere with the rotation of the second support part 520. The projections 541 and 542 may be guided to and accommodated in guide parts 611 and 621 which will be described later, thereby preventing the device support member 500 from being separated from the support assembly 20 while guiding the rotation of the second support part 520.

The projection support members 610 and 620 may have their respective first end portions 631 interposed between the shaft support members 210 and 220 and the second base part 32, and their second end portions 632 which are bent from the first end portions 631 and are formed therein with the guide parts 611 and 621 which accommodate the projections 541 and 542. The first end portions 631 of the projection support members 610 and 620 may be fastened to the second base part 32 together with the shaft support members 210 and 220. Also, as illustrated in FIG. 3, the projection support members 610 and 620 each have a height 610H/620H, width 610W/620W, and length 610L/620L.

The guide parts 611 and 621 may extend in the movement direction of the second support part 520 and guide movement of the projections 541 and 542 when the second support part 520 is rotated. The guide parts 611 and 621 are respectively formed in the respective symmetrical projection support members 610 and 620 provided respectively to correspond to the symmetrical projections 541 and 542 formed respectively in the left and right sides of the second support part 520. Thus, the projection support members 610 and 620 facilitate movement of the second support part 520 and the second support part 520 is prevented from seceding from the projection support members 610 and 620.

Although, in this exemplary embodiment of the present general inventive concept, the projection support members 610 and 620 and the shaft support members 210 and 220 are illustrated as distinct components, they may be integrated. In this case, the guide parts 611 and 621 may be formed in the shaft support members 210 and 220.

The second support part support member 700 may be joined to the second base part 32 and may movably support the second support part 520 in contact with the rear of the second support part 520, i.e., a surface opposite to a surface of the second support part 520 where the rack gears 531 and 532 are placed. The second support part support member 700 is disposed below the shaft 100 and the second support part 520 and the second support part 520 moves between the shaft 100 and the second support part support member 700 according to the tilt and rotation of the device body 10.

One region of the second support part support member 700 which supports the second support part 520 may be formed to correspond to the curvature of the second support part 520, such that the region does not interfere with movement of the second support part 520.

Hereinafter, on the basis of the above-described configuration, operation of the support assembly 20 according to the rotation of the device body 10 will be described with reference to FIG. 4.

Figure 4:
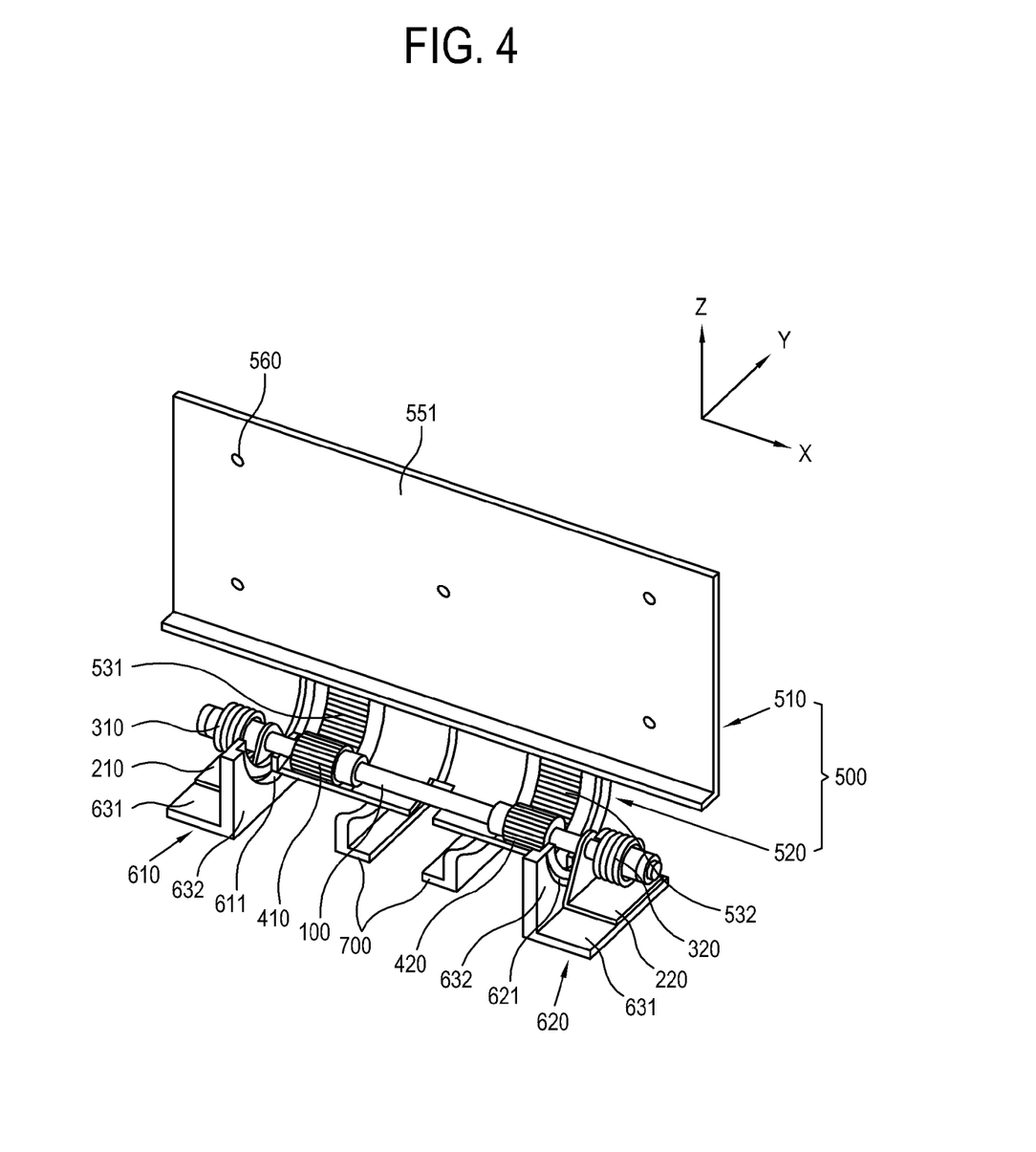
FIG. 4 is a perspective view of the support assembly in the condition where a device body is erected on an installation plane in the computer device of FIG. 2.

FIG. 4 is a perspective view of the support assembly 20 in the condition where the device body 10 is erected and rotated. It is noted that FIG. 4 does not show the device body 10 and the base member 30 for the purpose of clarity of a structure of the support assembly 20.

Referring to FIG. 4, as the first support part 510 is rotated to erect the device body 10, the second support part 520 may move around the shaft 100. At this time, the rack gears 531 and 532 move in engagement with the pinion gears 410 and 420.

Assuming that a region in the second support part 520 adjacent to the first support part 510 is an upper region of the second support part 520 and a region opposite to the upper region of the second support part 520 is a lower region of the second support part 520, the rack gears 531 and 532 in the lower region of the second support part 520 may engage the pinion gears 410 and 420.

In this state, weight of the device body 10 is applied to the device support member 500. In response to this application, the elastic members 310 and 320 may elastically bias the shaft 100 in a direction in which the device body 10 is erected on the installation plane and the rack gears 531 and 532 engage the pinion gears 410 and 420, thereby maintaining the rotation position of the device body 10 and the device support member 500. More specifically, since an elastic bias of the elastic members 310 and 320 against the shaft 100 is also exerted on the pinion gears 410 and 420 joined to the shaft 100, the pinion gears 410 and 420 elastically biased by the elastic members 310 and 320 can support to maintain the current position of the rack gears 531 and 532 to which the weight of the device body 10 is applied.

Figure 5:
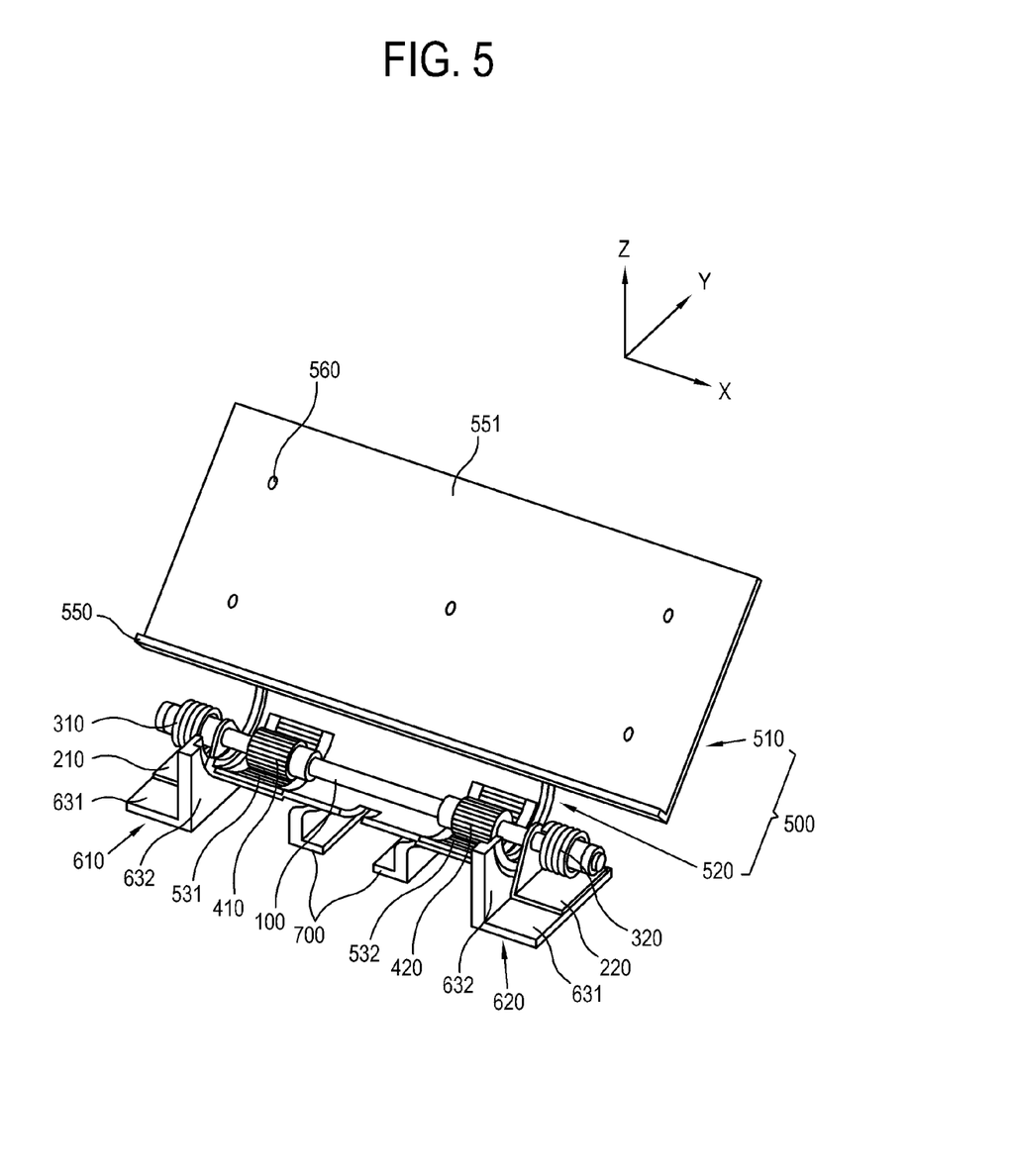
FIG. 5 is a perspective view of the support assembly in the condition where the device body is rotated at a given angle from the erected state in the computer device of FIG. 2.

FIG. 5 is a perspective view of the support assembly 20 in the condition where the device body 10 is rotated at a given angle toward the installation plane from the erected state.

Referring to FIG. 5, as the device body 10 is rotated, the rack gears 531 and 532 may move relative to the pinion gears 410 and 420 and the second support part 520 may move around the shaft 100.

When a user overcomes the elastic bias of the elastic members 310 and 320 and rotates the device body 10 by a predetermined angle, interaction between the elastic bias of the elastic members 310 and 320 and the rack gears 531 and 532/pinion gears 410 and 420 may overcome the weight of the device body 10 and hold the current rotation position of the device support member 500.

Figure 6:
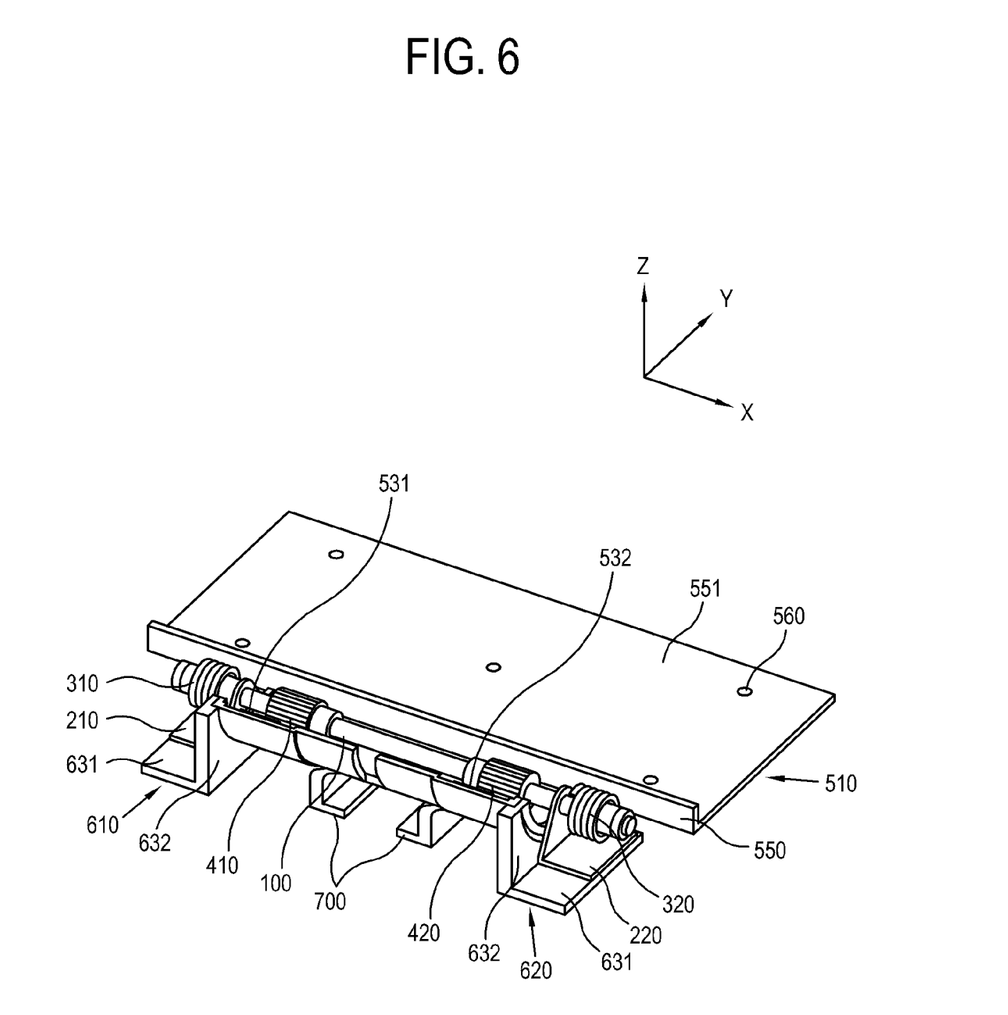
FIG. 6 is a perspective view of the support assembly in the condition where the device body is parallel to the installation plane in the computer device of FIG. 2.

FIG. 6 is a perspective view of the support assembly 20 in the condition where the device body 10 is parallel to the installation plane.

Referring to FIG. 6, when the device body 10 is rotated parallel to the installation plane, the rack gears 531 and 532 in the upper region of the second support part 520 may engage the pinion gears 410 and 420. If the computer device 1 is intended to be used in the tablet mode, a user can touch the display unit 11 conveniently by rotating the device body 10 in this manner.

As illustrated and described above in FIGS. 4 to 6, it can be seen that the extension length of the second support part 520 and the rack gears 531 and 532 is provided to correspond to the rotation angle of the device body 10 but may be adjusted in consideration of the diameter of the pinion gears 410 and 420 and the curvature of the second support part 520.

Figure 8:
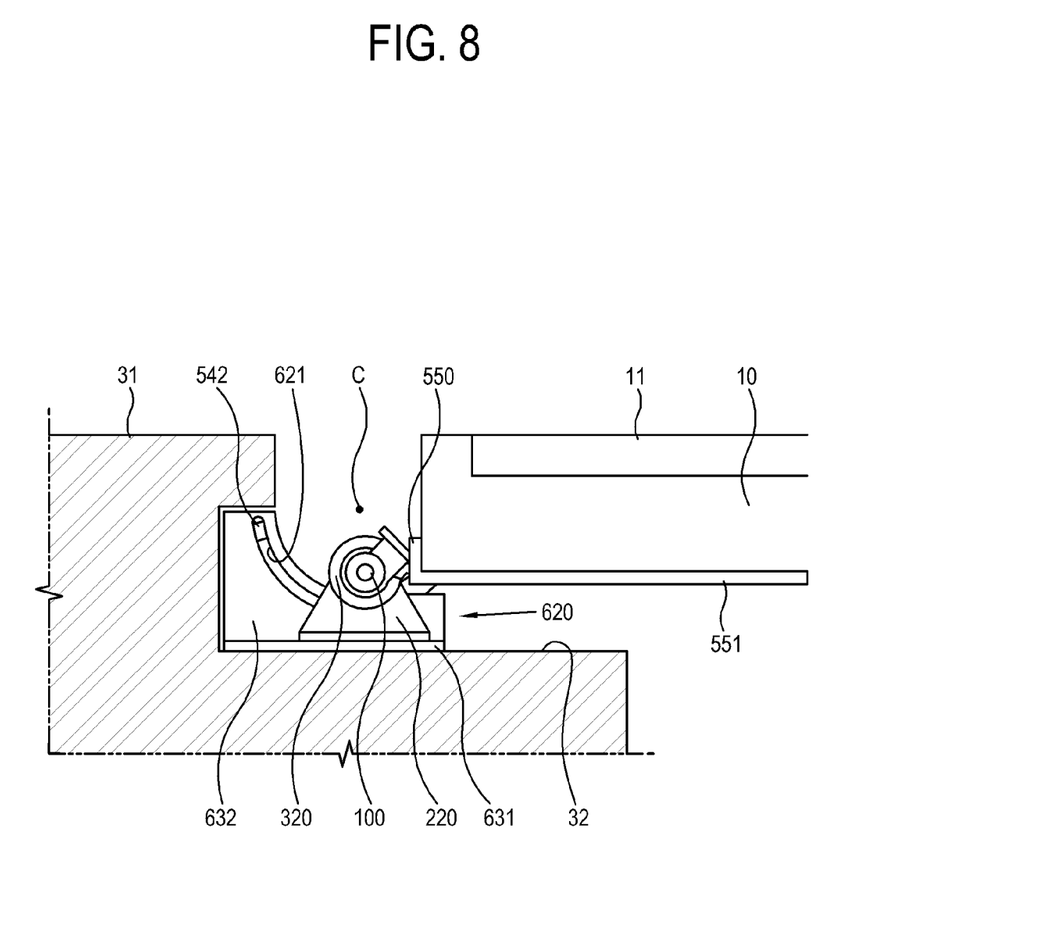
FIG. 8 is a side view of the support assembly of FIG. 6.

FIGS. 7 and 8 are side views illustrating a condition where the device body 10 is erected on the installation plane and a condition where the device body 10 is parallel to the installation plane, respectively.

As illustrated in FIGS. 7 and 8, when the second support part 520 is moved with rotation of the device body 10, the projection 542 projecting from the second support part 520 may be guided to and accommodate in the guide 621 formed in the projection support member 620.

Under the condition where the device body 10 is rotated parallel to the installation plane, steps of the first base part 31 and second base part 32 may be provided to allow the upper planes of the display unit 11 and the first base part 31 to have substantially the same height.

In FIGS. 7 and 8, a point C represents a curvature center of the second support part 520 and is located to be separated by a predetermined distance from the shaft 100 upwardly. With the rotation of the device body 10, the second support part 520 moves around the point C. In this manner, as the second support part 520 moves around the point C rather than the shaft 100, it can be configured that the shaft 100 may be prevented from projecting from the display unit 11 and the first base part 31 when a user faces the display unit 11. This results in improvement in the aspect of design.

While the device body 10 being operated in the normal mode and the tablet mode has been illustrated in the above exemplary embodiments of the present general inventive concept, it should be appreciated that any display bodies having the display unit 11 may be supported by the support assembly 20 of the present general inventive concept.

Although a few embodiments of the present invention have been illustrated and described, it would be appreciated by those skilled in the art that changes may be made in these exemplary embodiments without departing from the principles and spirit of the present general inventive concept, the scope of which is defined in the claims and their equivalents.

What is claimed is:

1. A support assembly to support a computer device body having a display unit, comprising:
    a base member supported on an installation plane;
    a shaft to extend in parallel to a plane of the base member;
    a first support member having one end portion joined to the base member and the other end portion to support the shaft;
    at least one pinion gear concentrically joined to the shaft;
    a second support member comprising:
        a first support part to support the computer device body having the display unit,
        a second support part to extend from the first support part to have a predetermined curvature, and
        a rack gear formed on a plane of the second support part facing the shaft along The extension direction of the second support part and to move according to rotation of the computer device body supported to the first support part, the rack gear to engage the at least one pinion gear in order to hold a position of the second support part; and
    a third support member joined to the base member and to movably support the second support member.

2. The support assembly according to claim 1, further comprising:
    an elastic member placed on the shaft to elastically bias the shaft in a direction in which the weight of the computer device body supported to the first support part is overcome.

3. The support assembly according to claim 1, wherein the center of the predetermined curvature of the second support part is different from the rotation center of the shaft.

4. The support assembly according to claim 1, wherein the one end portion joined to the base member being parallel to the installation plane, and the other end portion being erectly bent from the one end portion joined to the base member and configured to support the shaft.

5. The support assembly according to claim 1, wherein the second support member further comprises:
    a projection projecting from the second support part, and
    wherein the third support member comprises a projection support member having one end portion interposed between the first support member and the base member and the other end portion formed therein with a guide part to guide and accommodate the projection moving along the second support part.

6. The support assembly according to claim 1, wherein the third support member further comprises:
    a second support part support member joined to the base member and to support a surface opposite to a surface of the second support part where the rack gear is placed.

7. The support assembly according to claim 1, wherein the base member comprises:
    a first base part to extend parallel to the lengthwise direction of the shaft; and
    a second base part which has a step lower than the first base part, the first support member being joined to a plane of the second base part.

8. A computer device, comprising:
    a computer device body having a display unit placed in the front side; and
    a support assembly according to claim 1, which rotatably supports the computer device body with respect to the installation plane.

9. The support assembly according to claim 2, wherein the elastic member comprises a coil spring or a leaf spring, with a first end portion of the elastic member joined to the shaft and a second end portion of the elastic member joined to the first support member.

10. The support assembly according to claim 3, wherein an angular measure of the predetermined curvature of the second support part is smaller than an angular measure of the curvature of the pinion gear.

11. The support assembly according to claim 4, wherein the first support member is fastened to the base member by screws, rivets, or pins.

12. The support assembly according to claim 7, wherein the computer device body has a rectangular plate shape where the display unit is placed in the front side, and
    where a step between the first base part and the second base part is provided such that planes of the first base part and the display unit have substantially the same height when the computer device body is rotated in parallel to the installation plane.

13. A rack and pinion computer support device, comprising:
    a first support member to support a computer device;

a second support member extending from the first support member comprising a curved rack to rotate the first support member and a projection extending toward the first support member;

a shaft member comprising a pinion gear to engage with the curved rack;

a plurality of shaft support members to support the shaft member; and at least one fixed projection support member attached to the plurality of shaft support members to limit rotation of the first support member, wherein as the shaft member rotates, the engagement of the pinion gear along the curved rack rotates the first support member.

14. The rack and pinion computer support device of claim 13, wherein the at least one fixed projection support member comprises: a guide path to accommodate the projection to limit rotation of the first support member.

15. The rack and pinion computer support device of claim 13, further comprising:
an elastic member placed on the shaft member to elastically bias rotation of the shaft member.

16. The rack and pinion computer support device of claim 13, wherein the axis of rotation of the shaft member is located between a curvature center of the curved rack and the at least one projection support member.

17. The rack and pinion computer support device of claim 13, wherein the first support member comprises:
a first region to fasten to the computer device.

18. The rack and pinion computer support device of claim 13, wherein the first support member is capable of rotating within a range of about 0 to 90 degrees.

19. The rack and pinion computer support device of claim 17, wherein the first support member further comprises:
a second region substantially perpendicular to the first region to support the computer device.

* * * * *